United States Patent [19]

Shimizu et al.

[11] Patent Number: 5,322,541
[45] Date of Patent: Jun. 21, 1994

[54] METHOD OF PRODUCING GLASS BLANK

[75] Inventors: Yoshiyuki Shimizu, Neyagawa; Shoji Nakamura, Hirakata; Tadayoshi Yonemoto, Moriguchi; Masaaki Sunohara, Nishinomiya; Tadao Shioyama, Sakurai; Noriyuki Kawata, Omiya, all of Japan

[73] Assignees: Matsushita Electric Industrial Co., Ltd., Osaka; Sumita Optical Glass, Inc., Saitama, both of Japan

[21] Appl. No.: 857,872

[22] Filed: Mar. 26, 1992

[30] Foreign Application Priority Data

Mar. 28, 1991 [JP] Japan .................................. 3-64451

[51] Int. Cl.⁵ .............................................. C03B 11/00
[52] U.S. Cl. ............................................ 65/66; 65/75; 65/76; 65/78; 65/85; 65/127
[58] Field of Search ............... 65/66, 64, 127, 68, 65/72, 75, 76, 77, 78, 85

[56] References Cited

U.S. PATENT DOCUMENTS

| | | |
|---|---|---|
| 2,359,433 | 10/1944 | McNamara . |
| 3,293,017 | 12/1966 | Jenkins ................... 65/127 |
| 3,930,819 | 1/1976 | Martin . |
| 4,457,771 | 7/1984 | Ambrogi ................... 65/66 |
| 5,087,279 | 2/1992 | Monji et al. ............. 65/64 |

FOREIGN PATENT DOCUMENTS

| | | |
|---|---|---|
| 0378292 | 7/1990 | European Pat. Off. . |
| 0408065 | 1/1991 | European Pat. Off. . |
| 2569177 | 2/1986 | France ................... 65/127 |
| 58-84134 | 5/1983 | Japan . |
| 60-200833 | 10/1985 | Japan . |
| 1-133948 | 5/1989 | Japan . |
| 1-138144 | 5/1989 | Japan . |
| 1-145337 | 6/1989 | Japan . |
| 1-145340 | 6/1989 | Japan . |
| 1-148715 | 6/1989 | Japan . |
| 1-148717 | 6/1989 | Japan . |
| 1-153538 | 6/1989 | Japan . |
| 1-153539 | 6/1989 | Japan . |
| 1-153540 | 6/1989 | Japan . |
| 1-164738 | 6/1989 | Japan . |
| 1-201036 | 8/1989 | Japan . |
| 1-203234 | 8/1989 | Japan . |
| 1-212238 | 8/1989 | Japan . |
| 1-212239 | 8/1989 | Japan . |
| 1-212240 | 8/1989 | Japan . |
| 1-212241 | 8/1989 | Japan . |
| 2-14839 | 1/1990 | Japan . |
| 2-34525 | 2/1990 | Japan . |
| 2-252628 | 10/1990 | Japan . |

OTHER PUBLICATIONS

Minolta Camera Co., Patent Abstracts of Japan, vol. 15, No. 345 (C864), Sep. 3, 1991 JP-A-3137030.

Primary Examiner—Joye L. Woodard
Attorney, Agent, or Firm—Wenderoth, Lind & Ponack

[57] ABSTRACT

A method of producing a glass blank, comprising the steps of: supplying a desired weight of molten glass material to a bearer heated to a temperature of not more than a softening point of the glass material; performing and cancelling, at a temperature of not less than the softening point, pressing of the glass material supplied to the bearer so as to adjust a thickness of the glass material; and cooling the glass material to a temperature of not more than the softening point.

4 Claims, 8 Drawing Sheets

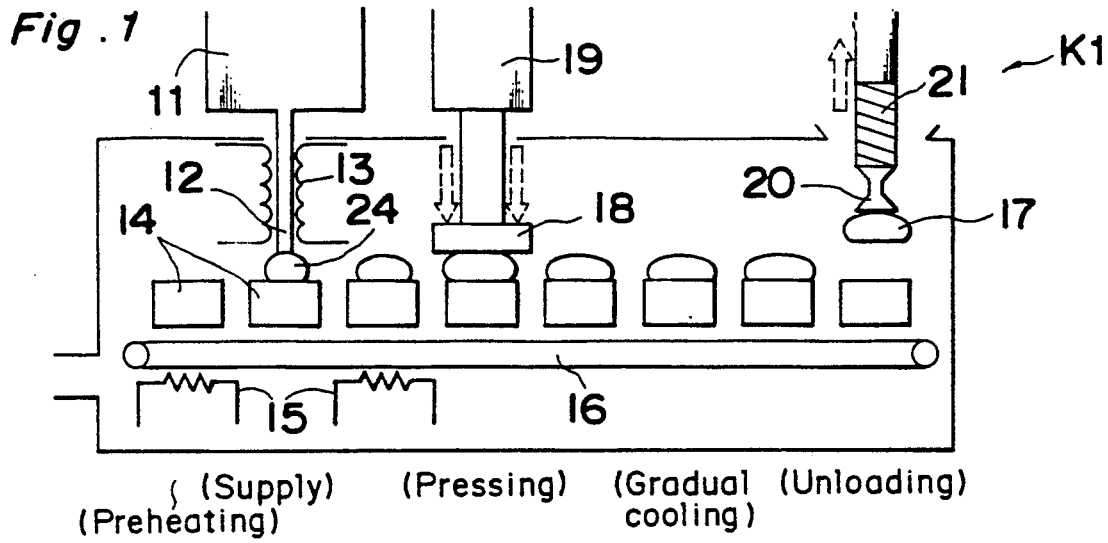
Fig. 1
(Preheating) (Supply) (Pressing) (Gradual cooling) (Unloading)
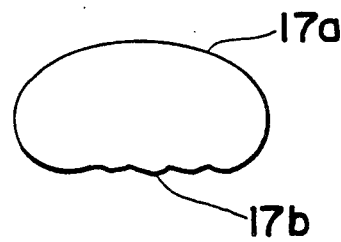
Fig. 2
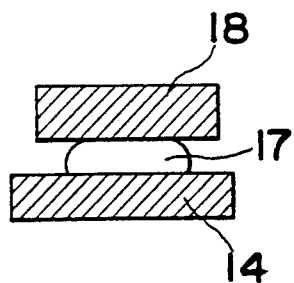 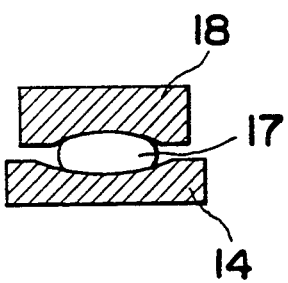 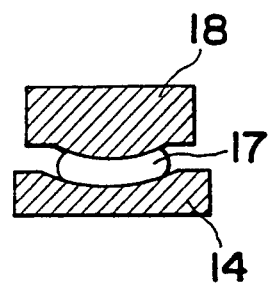
Fig. 3a    Fig. 3b    Fig. 3c
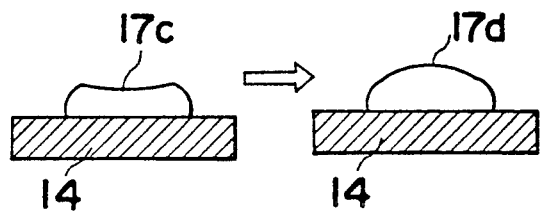
Fig. 4a    Fig. 4b

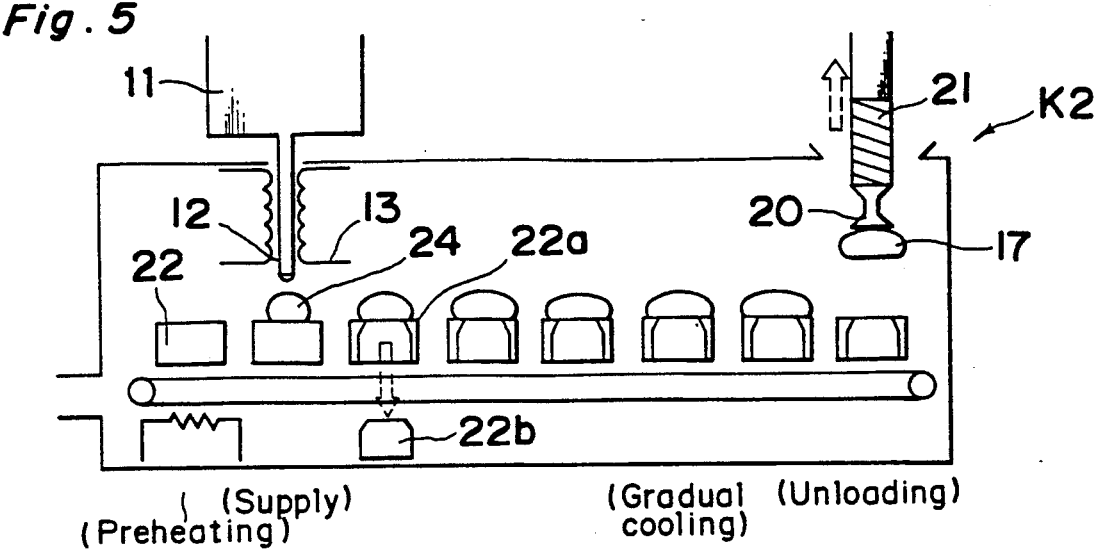
Fig. 5
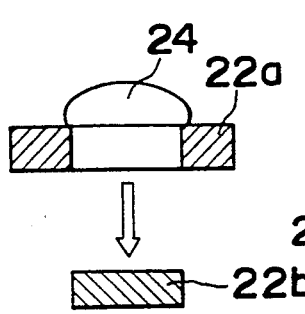 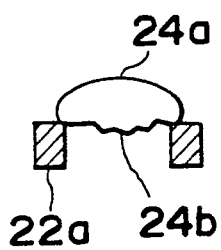 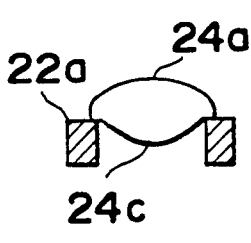
Fig. 6a   Fig. 6b   Fig. 6c
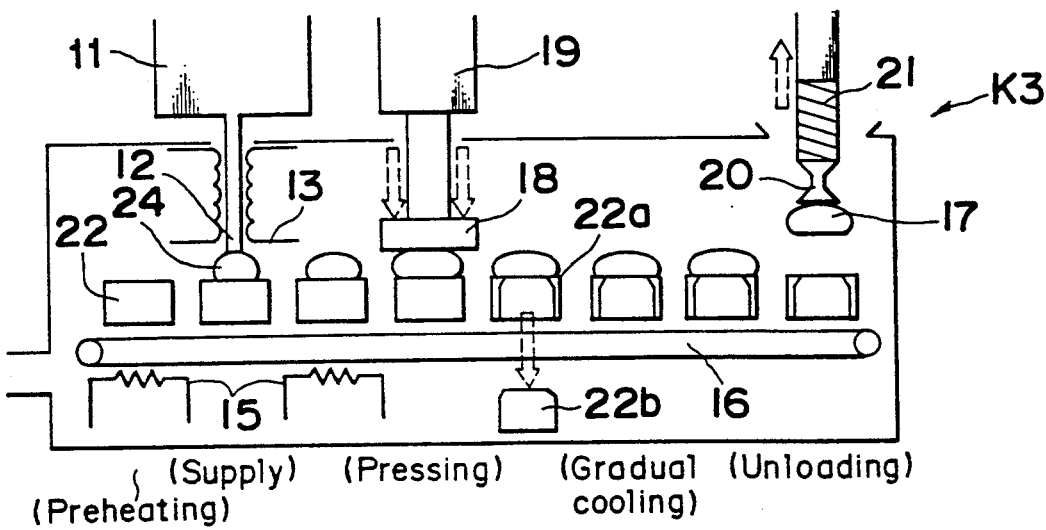
Fig. 7

Fig. 12a    PRIOR ART

[Production of glass blank]

(1) Molten glass (2) Glass plate (3) Cutting (4) Barreling (5) Trimming (6) Heating (7) Pressing (8) Jig bonding (9) Rough working of 1st face

(10) Rough working of 2nd face

(11) Intermediate working of 1st face

(12) Polishing of 1st face

(13) Inversion

(14) Intermediate working of 2nd face

(15) Polishing of 2nd face

(16) Coring

(17) Inspection

(18) Molding

Fig. 12b        PRIOR ART

[Production of polished lens]

(1) Molten glass (2) Glass plate (3) Cutting (4) Barreling (5) Trimming (6) Heating (7) Pressing (8) Jig bonding (9) Rough working of 1st face

(10) Rough working of 2nd face

(11) Intermediate working of 1st face

(12) Polishing of 1st face

(13) Inversion

(14) Intermediate working of 2nd face

(15) Polishing of 2nd face

(16) Coring

(17) Deposition

(18) Inspection

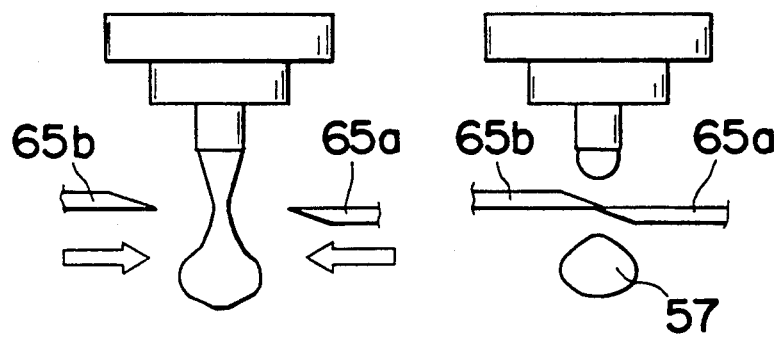
Fig. 15a PRIOR ART
Fig. 15b PRIOR ART
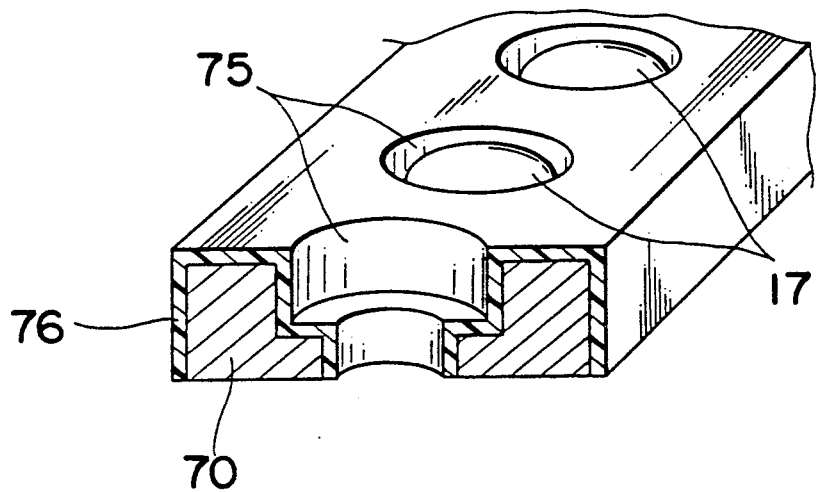
Fig. 16

METHOD OF PRODUCING GLASS BLANK

BACKGROUND OF THE INVENTION

The present invention relates to a method of and an apparatus for producing a glass blank for optical glass elements such as a lens, a prism, etc. used in optical instruments.

Recently, a number of attempts have been made in which an optical lens is formed by a single molding process without a polishing process. Thus, at present, optical lenses are being mass produced by such molding process. To this end, a method is most efficient in which a glass blank in a molten state is poured onto a die so as to be subjected to pressure molding. However, in this method, it is difficult to control contraction of glass during its cooling. Thus, this method is not suitable for accurate molding of lenses. Therefore, a method is generally employed in which a glass blank is preliminarily worked to a specific shape so as to be supplied between dies and then, is heated and pressure molded as disclosed in, for example, Japanese Patent Laid-Open Publication Nos. 58-84134 (1983) and 60-200833 (1985). Meanwhile, Japanese Patent Laid-Open Publication Nos. 2-34525 (1990) and 2-14839 (1990) teach such preliminary working of the glass blank.

Hereinbelow, the above mentioned known methods of producing the glass blank are described with reference to FIGS. 11 to 14. FIGS. 11a and 11b show a known method of molding a glass lens. In this known method, a spherical glass blank shown in FIG. 11a is supplied between upper and lower dies 52 and 53 so as to be pressured molded therebetween into a molded lens 54 of FIG. 11b by pressing the upper die 52 towards the lower die 53 in a sleeve die 51. The upper die 52 is slidably movable in the sleeve die 51.

FIG. 12a shows steps of a known method of producing a glass blank, while FIG. 12b shows steps of a known method of producing a polished lens. The steps of FIG. 12a are substantially the same as those of FIG. 12b. Namely, inspection step (17) and molding step (18) of FIG. 12a are, respectively, replaced by deposition step (17) and inspection step (18) in FIG. 12b.

FIGS. 13a and 13b show a known method of molding a glass element. As shown in FIG. 13a, molten glass is poured from an discharge outlet 55 so as to be received by a molding die 56 disposed below the discharge outlet 55. When a predetermined amount of the molten glass has been poured into the molding die 56, the molding die 56 is lowered at a velocity larger than a flow velocity of the molten glass from the discharge outlet 55 such that the molten glass flowing downwardly from the discharge outlet 55 is separated from the molten glass poured into the molding die 56. Thus, the molten glass poured into the molding die 56 is cooled in the molding die 56 until at least a surface of the molten glass is set, whereby the glass element is obtained.

FIG. 14 shows a known method of molding a glass member. In this known method, molten glass flowing from the discharge outlet 55 is dropped by its own weight or is cut by engaging opposed blades 65a and 65b with each other as shown in FIGS. 15a and 15b such that a molten glass lump 57 falls into a recess 60 of a molding die 58. At this time, gas such as air, inert gas or the like is blown into the recess 60 through a pore 59 opening into the recess 60 such that a gaseous layer is formed between the molten glass lump 57 and a side surface of the recess 60 of the molding die 58 as shown in FIG. 14. Thus, until at least a portion of a surface of the molten glass lump 57 reaches a temperature of not more than a softening point of glass, the molten glass lump 57 is held in the recess 60 substantially out of contact with the side surface of the recess 60 so as to be cooled such that the glass member is produced.

However, the glass lens molded by the above known method of FIGS. 11a and 11b has such a drawback that unless a maximum surface roughness of the glass blank supplied into the die is 0.1 $\mu$m or less, the glass lens has defects on the optical face and thus, cannot fulfil optical performances sufficiently.

Meanwhile, the known method of producing the glass blank shown in FIG. 12a requires time and cost equivalent to those for working of a glass lens, so that the glass blank becomes expensive.

Furthermore, in the known method of molding the glass element shown in FIGS. 13a and 13b, when the molten glass is brought into contact with the molding die 56, the molten glass is cooled rapidly. As a result, large wrinkled defects are produced on a contact surface of the molten glass relative to the molding die due to thermal shrinkage. Therefore, in the case where an optical element is formed by this known method, defects are produced on the optical face of the optical element undesirably.

Moreover, in the known method of molding the glass member of FIG. 14, not only it is difficult to deform the glass member into a desired shape but amount of the molten glass flowing from the discharge outlet is not stable due to influence of the gas blown into the recess through the pore of the molding die, which recess is disposed immediately below the discharge outlet.

SUMMARY OF THE INVENTION

Accordingly, an essential object of the present invention is to provide a method of and an apparatus for producing a glass blank, by which the glass blank can be stably formed to a shape approximate to a desired shape of an optical element at low cost.

In order to accomplish this object of the present invention, the present invention produces as described below a glass blank which can be molded into an optical element satisfying optical performances sufficiently.

Initially, molten glass having a weight identical with a desired weight of the glass blank is received by a bearer. To this end, for example, flow of the molten glass from a discharge outlet of a glass melting furnace is received by a flat plate which not only has excellent heat resistance but is worked to a mirror surface. When weight of the molten glass has reached the desired weight, the bearer is rapidly lowered such that flow of the molten glass from the discharge outlet is separated from the molten glass poured onto the flat plate. Thus, the glass blank, which has a free surface produced by surface tension of the molten glass and a contact surface relative to the bearer, is formed on the bearer.

Subsequently, when temperature of the glass blank is a softening point of glass or less, the glass blank is pressed in a cold state so as to be deformed into a desired shape and then, is cooled gradually, whereby the glass blank is produced.

Meanwhile, after the above mentioned glass blank has been formed on the bearer, the contact surface of the glass blank relative to the bearer is set free before temperature of the glass blank reaches the softening point of glass or less, whereby the glass blank is produced.

By the above described arrangement, the following glass blank to be molded into the glass optical element is produced. The molten glass received by the bearer has large wrinkled defects due to thermal shrinkage caused at the time of contact of the molten glass with the bearer. When the glass blank having such defects is molded into the optical element, the optical element malfunctions due to the defects of the glass blank.

Therefore, by heating the bearer before the molten glass comes into contact with the bearer, thermal shrinkage of the contact surface of the glass blank relative to the bearer is lessened and thus, the wrinkled defects of the glass blank can be reduced.

Furthermore, when the contact surface of the glass blank relative to the bearer is set free before temperature of the glass blank reaches the softening point of glass or less, the wrinkled defects of the glass blank are changed to a convex shape having a mirror surface, by heat or own weight of the glass blank.

Meanwhile, when the molten glass flowing from the discharge outlet is received by the bearer and is pressed in a cold state by a die before temperature of the molten glass reaches the softening point of glass or less, the glass blank can be deformed into a desired shape substantially. In addition, by releasing the die from the glass blank when temperature of the glass blank is not less than the softening point of glass, the molded surface of the glass blank can be formed into a mirror surface by heat or surface tension of the glass blank.

When the above mentioned glass blank is molded into an optical element, the defects of the glass blank do not lead to malfunction of the optical element and desired optical performances of the optical element can be obtained.

In accordance with the present invention, the glass blank for use in production of the optical element can be produced in as short a period as a few seconds by using the inexpensive apparatus. Therefore, the glass blank can be produced at far lower cost than that of a glass blank based on conventional polishing, so that the present invention provides the method of and the apparatus for producing the glass blank, whose industrial value is remarkably high.

Since the present invention includes the cold press process, the glass blank can be formed into a desired shape substantially. As a result, when the glass blank has been formed into an optical element, desired optical performances of the optical element can be readily obtained, thereby resulting in remarkable improvement of productivity and drastic reduction of production cost of the optical element.

BRIEF DESCRIPTION OF THE DRAWINGS

This object and features of the present invention will become apparent from the following description taken in conjunction with the preferred embodiments thereof with reference to the accompanying drawings, in which:

FIG. 1 is a schematic sectional view showing an apparatus for producing a glass blank, according to a first embodiment of the present invention;

FIG. 2 is a sectional view of the glass blank produced by the apparatus of FIG. 1;

FIGS. 3a to 3c are sectional views showing various shapes of a press tool and a bearer employed for a cold press process in the apparatus of FIG. 1, respectively;

FIGS. 4a and 4b are sectional views of states in the apparatus of FIG. 1 after the cold press process of FIGS. 3a to 3c;

FIG. 5 is a schematic sectional view showing an apparatus for producing a glass blank, according to a second embodiment of the present invention;

FIGS. 6a to 6c are sectional views showing operation of a bearer of the apparatus of FIG. 5;

FIG. 7 is a schematic sectional view showing an apparatus for producing a glass blank, according to a third embodiment of the present invention;

FIGS. 12a and 12b are charts showing steps of a prior art method of producing a glass blank and steps of a prior art method of producing a polished lens, respectively (already referred to);

FIGS. 15a and 15b are schematic views showing cutting of molten glass flow in the prior art method of FIG. 14 (already referred to); and FIG. 16 is a fragmentary perspective view partly in section of a container for accommodating the glass blank, employed in the present invention.

Before the description of the present invention proceed, it is to be noted that like parts are designated by like reference numerals throughout several views of the accompanying drawings.

DETAILED DESCRIPTION OF THE INVENTION

Figure 8:
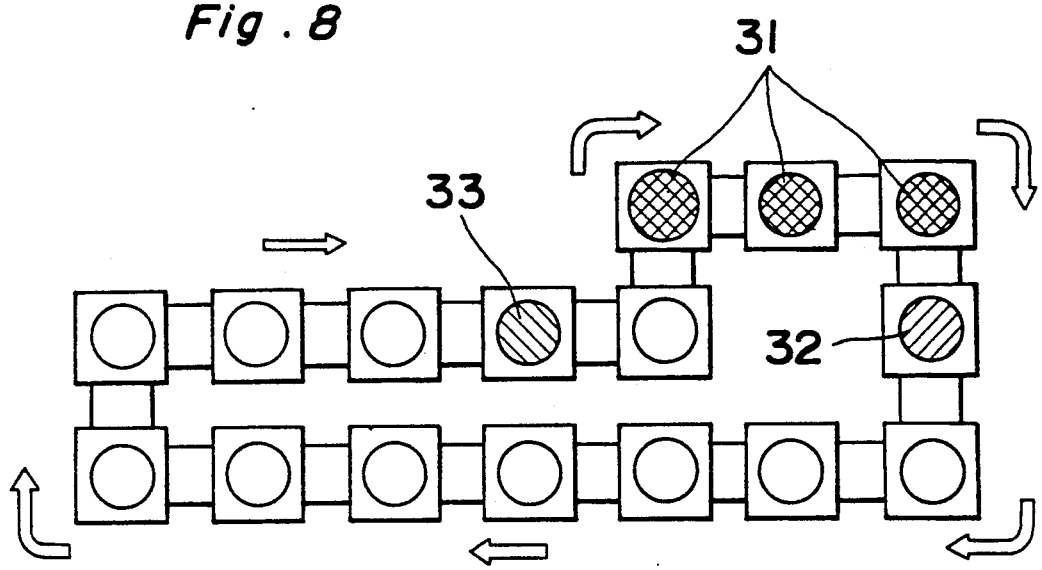
FIG. 8 is a top plan view of one arrangement of the apparatus of FIG. 7.

Referring now to the drawings, there is shown in FIG. 1, steps of a method of and an apparatus K1 for producing a glass blank 17, according to a first embodiment of the present invention. The apparatus K1 includes a glass melting furnace 11 having a discharge outlet (nozzle) 12 for discharging molten glass 24, heaters 13 and 15, a plurality of bearers 14 for supporting the molten glass 24, a chain conveyor 16, a press cylinder 19 having a press tool 18, a suction pad 20 and a spring 21.

In FIG. 1, the steps of the method proceed rightwards and include preheating of the bearer 14, supply of the molten glass 24 to the bearer 14, pressing of the glass blank 17, gradual cooling of the glass blank 17 and unloading of the glass blank 17 sequentially.

Initially, glass molten by the glass melting furnace 11 is supplied to the bearer 14 while temperature of the molten glass 24 is being controlled by the heater 13. As shown in FIG. 2, the glass blank 17 formed at this stage is controlled to a desired weight and has a free surface 17a and a contact surface 17b relative to the bearer 14. The free surface 17a is a quite excellent mirror surface formed by surface tension of the molten glass 24. Meanwhile, the contact surface 17b is subjected to thermal shrinkage due to temperature difference between the contact surface 17b and the bearer 14 and thus, is a wrinkled rough surface. Therefore, in order to prevent rapid cooling of the molten glass 24 supplied to the bearer 14, the bearer 14 is heated by the heaters 15, so that the wrinkled rough contact surface 17b is improved.

Subsequently, the bearer 14 having the glass blank 17 supplied thereto is transported to a location below the press tool 18 by the chain conveyor 16. In order to prevent the glass blank 17 from being rapidly cooled below a softening point of glass during transport of the bearer 14, the bearer 14 is heated by the heaters 15 even while the bearer 14 is being transported. Simultaneously with transport of the bearer 14 to the location immediately below the press tool 18, the press tool 18 controlled to a certain temperature is pressed by the air press cylinder 19 against the glass blank 17 placed on the bearer 14 as shown in FIG. 3a. At this time, the glass blank 17 is cooled. However, as shown in FIG. 4a, before temperature of a contact surface 17c of the glass blank 17 relative to the press tool 18 drops to the softening point of glass or less, the press tool 18 is released from the glass blank 17 such that the contact surface 17c is again set free. Thereafter, the glass blank 17 is cooled spontaneously while being displaced together with the bearer 14. Thus, the contact surface 17c of the glass blank 17 relative to the press tool 18 is formed into a quite excellent mirror surface 17d by surface tension as shown in FIG. 4b.

In this embodiment, the glass blank 17 is pressed by the press tool 18 for the purpose of adjusting thickness of the finally obtained glass blank 17. More specifically, this pressing of the glass blank 17 by the press tool 18 is performed such that thickness of the glass blank 17 obtained in this embodiment is adjusted substantially to that of an optical element, for example, a convex lens to be molded by using the glass blank 17. By adjusting thickness of the glass blank 17 during production of the glass blank 17 as described above, molding process of the optical element can be facilitated.

Subsequently, when temperature of the glass blank 17 has reached the softening point of glass or less upon further gradual cooling, the glass blank 17 is sucked and unloaded by the suction pad 20. If the glass blank 17 is cooled rapidly at the time when the suction pad 20 is brought into contact with the glass blank 17, strain is produced in the glass blank 17, thereby resulting in fracture of the glass blank 17. Thus, the suction pad 20 is made of material having a coefficient of thermal conductivity of not more than 0.01 cal./cm.sec.°C. in order to prevent rapid cooling of the glass blank 17. Furthermore, the spring 21 is employed for adjusting a pressing force of the suction pad 20 so as to prevent damage to the surface of the glass blank 17.

The unloaded glass blank 17 is cooled by air and then, is accommodated in one of a plurality of circular openings 75 of a container 70 as shown in FIG. 16. The container 70 has a surface treatment layer 76 of Teflon resin (brand name of E.I. du Pont de Nemours & Co., Inc. of the U.S.) for preventing damage to the surface of the glass blank 17.

In this embodiment, the press tool 18 and the bearer 14 are each formed by a flat plate as shown in FIG. 3a but may have various shapes as shown in FIGS. 3b and 3c.

FIG. 5 shows steps of a method of and an apparatus K2 for producing the glass blank 17, according to a second embodiment of the present invention. The apparatus K2 includes a plurality of bearers 22. In the bearer 22, a central portion 22b is detachably fitted into an outer peripheral portion 22a. The molten glass 24 is supplied to the bearer 22 from the melting furnace 11 so as to be formed into the glass blank 17. Since other constructions of the apparatus K2 are similar to those of the apparatus K1, description thereof is abbreviated for the sake of brevity.

In FIG. 5, the steps of the method proceed rightwards and include preheating of the bearer 22, supply of the molten glass 24 to the bearer 22, gradual cooling of the glass blank 17 and unloading of the glass blank 17 sequentially.

Initially, lanthanum series glass, which consists of 42 wt. % of boron oxide ($B_2O_3$), 30 wt. % of lanthanum oxide ($La_2O_3$), 10 wt. % of calcium oxide (CaO), 8 wt. % of zirconia ($ZrO_2$) and the remainder being minute amounts of components, is molten in the melting furnace 11 at 1,400° C. and is discharged from the nozzle 12 which is held at a temperature of 970° C. by the heater 13. The discharged molten glass 24 is received by the bearer 22. The bearer 22 is made of, for example, stainless steel of SUS 316 (JIS). Flow of the molten glass 24 from the nozzle 12 is separated from the molten glass 24 supplied to the bearer 24 when about 2.8 grams of the molten glass 24 has been loaded onto the bearer 22.

As shown in FIG. 6a, the molten glass 24 formed at this stage has a free surface 24a and a contact surface 24b relative to the bearer 22. The free surface 24a is formed by surface tension of the molten glass 24 and is a quite excellent mirror surface having a centerline-average surface roughness Ra (JIS B 0601) of not more than 0.01 $\mu$m. On the other hand, the contact surface 24b is subjected to thermal shrinkage by temperature difference between the molten glass 24 and the bearer 22 and thus, is a wrinkled rough surface having a centerline-average surface roughness of not less than 4.0 $\mu$m. However, when the bearer 22 is heated to 550° C. by the heaters 15 so as to prevent the supplied molten glass 24 from being cooled rapidly, the wrinkled rough surface is improved to a centerline-average surface roughness of not more than 3 $\mu$m.

Furthermore, when temperature of the molten glass 24 is equal to or higher than the softening point of glass of 670° C., the central portion 22b is separated from the outer peripheral portion 22a as shown in FIGS. 6a and 6b so as to improve surface roughness of the contact surface 24b such that the contact surface 24b of the molten glass 24 is set free. As shown in FIG. 6c, the contact surface 24b released from the central portion 22b is formed into a convex mirror surface 24c having a centerline-average surface roughness of not more than 1.0 $\mu$m by surface tension and own weight of the molten glass 24.

Subsequently, the molten glass 24 is cooled gradually while being displaced together with the bearer 22. Thus, when temperature of the molten glass 24 has reached the softening point of glass or less, the glass blank 17 is unloaded by the suction pad 20. Since the suction pad 20 is made of a ceramic material having a small coefficient of thermal conductivity, such an undesirable phenomenon can be prevented that the glass blank 17 is fractured due to rapid cooling of the glass blank 17 through its contact with the suction pad 20. The ceramic material may be "Macor" (brand name of Corning Glass Works of the U.S.) which consists of 46 wt. % of silicon dioxide ($SiO_2$), 17 wt. % of magnesium oxide (MgO), 16 wt. % of aluminum oxide (Al$_2$O$_3$), 10 wt. % of potassium oxide (K$_2$O), 7 wt. % of boron oxide (B$_2$O$_3$) and 4 wt. % of fluorine (F) and has a coefficient of thermal conductivity of 0.004 cal./cm-.sec.°C. Meanwhile, the spring 21 is employed for adjusting a pressing force of the suction pad 20 to 0.1 kgf/cm$^2$ or less so as to prevent the suction pad 20 from damaging the surface of the glass blank 17.

The unloaded glass blank 17 is cooled by air and then, is accommodated in one of the openings 75 of the container 70 having the surface treatment layer 76 as shown in FIG. 16.

Meanwhile, in order to prevent fusion bonding between the bearer 22 and the molten glass 24, etc., it is desirable that interior of the apparatus K2 has nonoxidizing atmosphere. To this end, interior of the apparatus K2 has atmosphere of hydrocarbon halide in which nitrogen gas and trichlorofluoroethane (C$_2$Cl$_3$F$_3$) gas are mixed with each other at flow rates of 20 l/min. and 1 l/min., respectively.

FIG. 7 shows steps of a method of and an apparatus K3 for producing the glass blank 17, according to a third embodiment of the present invention. The steps of the method of FIG. 7 are the same as those of FIG. 1. Initially, borosilicate glass, which consists of 65 wt. % of silicon dioxide (SiO$_2$), 10 wt. % of boron oxide ), 10 wt. % of sodium oxide (Na$_2$O), 9 wt. % of potassium oxide (K$_2$O) and the remainder being minute amounts of components, is molten in the melting furnace 11 at 1,350° C. and is discharged from the nozzle 12 which is held at a temperature of 920° C. by the heater 13. The discharged molten glass 24 is received by the bearer 22. By setting a diameter of a distal end of the nozzle 12 to a specific value and controlling temperature of the nozzle 12, about 1,230 mg of the molten glass 24 is supplied to the bearer 22 stably.

As shown in FIG. 2, the glass blank 17 formed at this stage has the free surface 17a and the contact surface 17b relative to the bearer 22. The free surface 17a is formed by surface tension of the molten glass 24 and is a quite excellent mirror surface having a centerline-average surface roughness of not more than 0.01 μm. On the other hand, the contact surface 17b is subjected to thermal shrinkage by temperature difference between the glass blank 17 and the bearer 22 and thus, is a wrinkled rough surface having a centerline-average surface roughness of not less than 4.0 μm. However, when the bearer 22 is heated to 650° C. by the heaters 15 so as to prevent the supplied molten glass 24 from being cooled rapidly, the wrinkled rough surface is improved to a centerline-average surface roughness of not more than 2.6 μm.

Subsequently, the bearer 24 is displaced to a location below the press tool 18 by the chain conveyor 16. In order to prevent the glass blank 17 from being rapidly cooled below a softening point of glass during displacement of the bearer 22, the bearer 22 is heated by the heaters 15 even while being displaced. Simultaneously with displacement of the bearer 22 to the location immediately below the press tool 18, the glass blank 17 is pressed in a cold state by the press tool 18 controlled to a temperature of 500° C. Furthermore, as shown in FIG. 4a, before temperature of the contact surface 17c of the glass blank 17 relative to the press tool 18 drops to the softening point of glass or less, the press tool 18 is released from the glass blank 17 such that the contact surface 17c is again set free. Then, the glass blank 17 is cooled spontaneously while being transported together with the bearer 22. Thus, the contact surface 17c of the glass blank 17 relative to the press tool 18 is formed into the quite excellent mirror surface 17d by surface tension as shown in FIG. 4b.

As shown in FIG. 6b, the molten glass 24 formed at this stage includes the free surface 24a and the contact surface 24b relative to the bearer 24. Furthermore, in order to improve the rough contact surface 24b of the molten glass 24, the central portion 22b of the bearer 22 is separated from the outer peripheral portion 22a as shown in FIGS. 6a and 6b such that the contact surface 24b of the molten glass 24 relative to the bearer 22 is set free. As shown in FIG. 6c, the contact surface 24b released from the central portion 22b of the bearer 22 is formed into the convex mirror surface 24c having a centerline-average surface roughness of not more than 1.0 μm by surface tension and own weight of the molten glass 24.

Then, the molten glass 24 is cooled gradually while being transported together with the bearer 22. Thus, when temperature of the molten glass 24 has reached the softening point of glass or less, the glass blank 17 is unloaded by the suction pad 20. .Since the subsequent processings are identical with those of the apparatus K2, description thereof is abbreviated for the sake of brevity.

Figure 9:
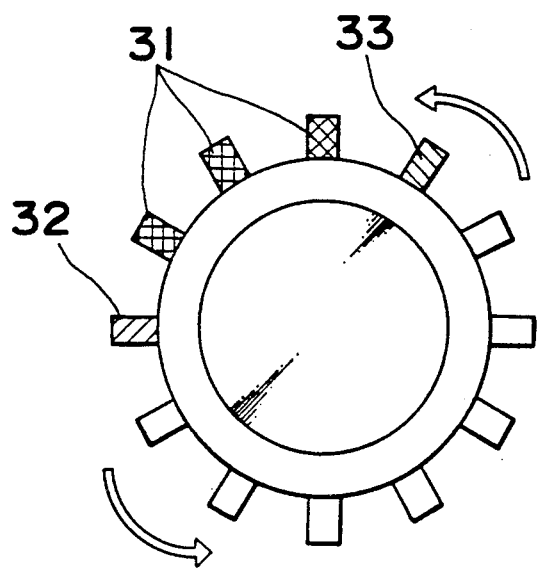
FIG. 9 is a top plan view of another arrangement of the apparatus of FIG. 7.

In this embodiment, a conveyor type transport means having a preheating section 31, a molten glass supplying section 32 and a glass blank unloading section 33 as shown in FIG. 8 is employed for displacing the bearer 22 but may also be replaced by an indexing type transport means shown in FIG. 9.

Then, a fourth embodiment of the present invention is described. In this embodiment, a glass blank having compositions different from those of the first to third embodiments is produced by using an apparatus similar to the apparatus K1 of the first embodiment.

Initially, dense flint glass, which consists of 52 wt. % of silicon dioxide (SiO$_2$), 35 wt. % of lead oxide (PbO), 6 wt. % of potassium oxide (K$_2$O) and the remainder being minute amounts of components, is molten in the melting furnace 11 at 1,250° C. and is discharged from the nozzle 12 which is held at a temperature of 750° C. by the heater 13. The discharged molten glass 24 is received by the bearer 14 made of carbon. By setting a diameter of a distal end of the nozzle 12 to a specific value and controlling temperature of the nozzle 12, about 2,600 mg of the molten glass 24 is supplied to the bearer 14 stably.

As shown in FIG. 2, the glass blank 17 formed at this stage has the free surface 17a and the contact surface 17b relative to the bearer 14. The free surface 17a is formed by surface tension of the molten glass 24 and is a quite excellent mirror surface having a centerline-average surface roughness of not more than 0.01 μm. Meanwhile, by heating the bearer 14 to 600° C. by the heaters 15, the wrinkled rough contact surface 17b can be improved to a centerline-average surface roughness of not more than 3.0 μm.

Figure 10:
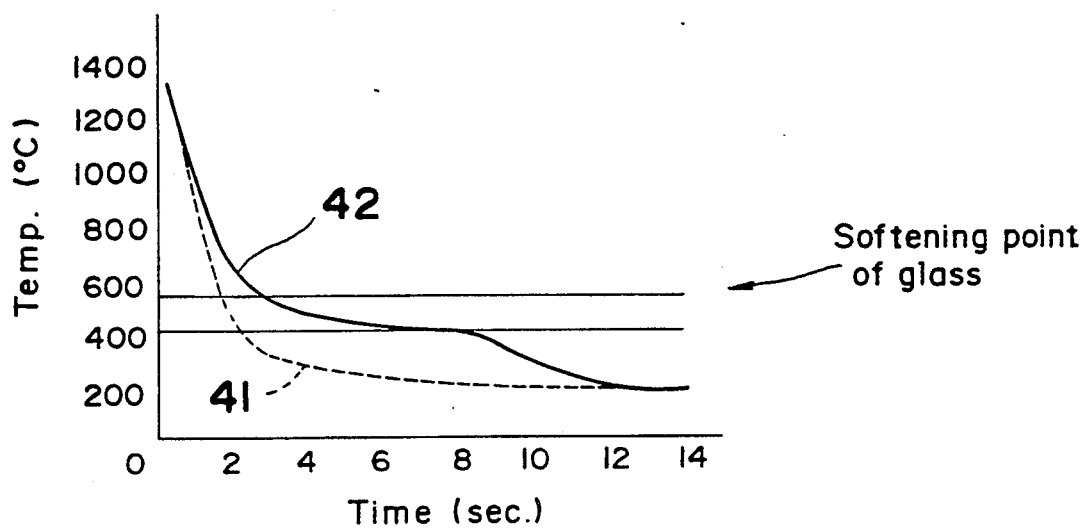
FIG. 10 is a graph showing cooling of a glass blank produced by a method according to a fourth embodiment of the present invention.
Figures 11A, 11B:
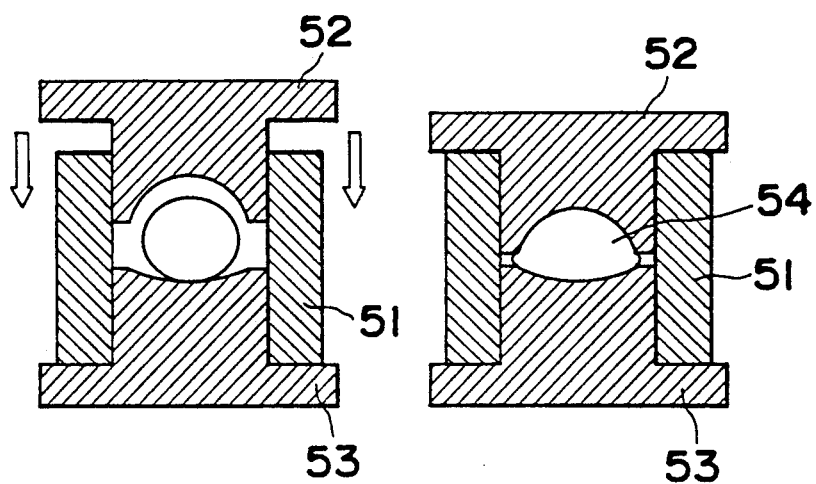
FIGS. 11a and 11b are fragmentary sectional views showing a prior art method of molding an optical element (already referred to)
Figures 13A, 13B:
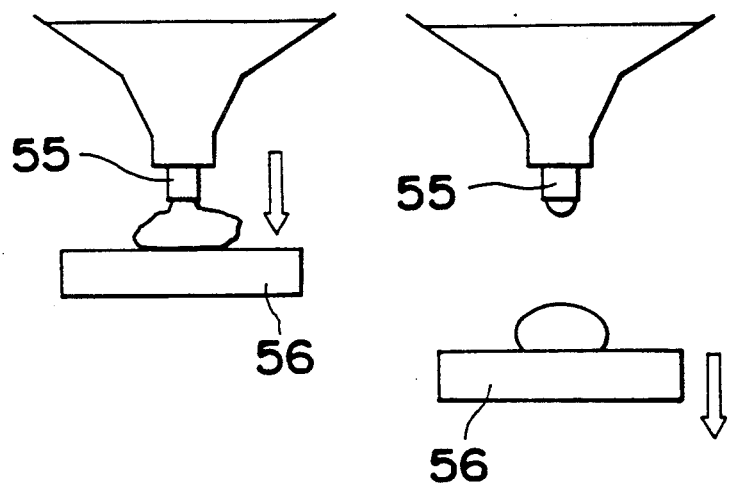
FIGS. 13a and 13b are fragmentary sectional views showing a method of producing a glass blank (already referred to)
Figure 14:
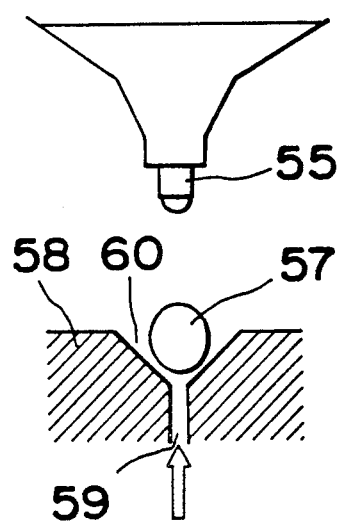
FIG. 14 is a fragmentary sectional view showing a prior art method of producing a glass blank (already referred to)

As shown by the curve 42 of the solid line in FIG. 10, this is because cooling gradient at the time of cooling of the molten glass 24 upon contact of the molten glass 24 with the bearer 14 becomes gentler than that of spontaneous cooling of the curve 41 of the broken line. Since changes of the curve 42 above and below the softening point of glass are smooth, it becomes possible to easily synchronize actuation of the press tool 18 with cooling of the molten glass 24.

Then, the bearer 14 is displaced to a location below the press tool 18 by the chain conveyor 18 and the glass blank 17 is pressed in a cold state by the press tool 18 which is controlled to a temperature of 450° C. Furthermore, before temperature of the glass blank 17 reaches the softening point of glass or less, the press tool 18 is released from the glass blank 17 such that the contact surface 17c of the glass blank 17 relative to the press tool 18 is again set free. Thus, the contact surface 17c of the glass blank 17 relative to the press tool 18 changes to the quite excellent mirror surface 17d formed by surface tension.

Subsequently, the glass blank 17 is cooled gradually while being displaced. When temperature of the glass blank 17 has reached the softening point of glass or less, the glass blank 17 is unloaded by the suction pad 20 in the same manner as in the apparatus K1. Since the subsequent operations are similar to those of the apparatus K2, description thereof is abbreviated for the sake of brevity.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A method of producing a glass blank for molding an optical element, comprising the steps of:
   supplying a desired weight of molten glass material to a bearer heated to a temperature of not more than the softening point of the glass material;
   applying pressure to the surface of the glass material opposite the surface in contact with the bearer at a temperature of not less than the softening point of the glass material to adjust the thickness of the glass material to a value approximate to the thickness of the optical element;
   cancelling the applied pressure while the glass material is at a temperature of not less than the softening point of the glass material so that the surface opposite the bearer contact surface is free;
   releasing a portion of the surface of the glass contacting the bearer from contact with the bearer while the temperature of the glass is not less than the softening point of the glass to form a free surface; and
   cooling the glass material to a temperature of not more than the softening point of the glass.

2. A method as claimed in claim 1, further comprising the step of picking up the glass material from the bearer by using a member whose force applied to the glass material is adjustable,
   the member having a coefficient of thermal conductivity of not more than 0.01 cal./cm.sec.°C.

3. A method of producing a glass blank, comprising the steps of:
   supplying a desired weight of molten glass material to a bearer heated to a temperature of not more than a softening point of the glass material;
   performing and cancelling, at a temperature of not less than the softening point, pressing of the glass material supplied to the bearer so as to adjust a thickness of the glass material;
   releasing from the bearer, as a free surface, a portion of a contact surface of the glass material relative to the bearer at a temperature of not less than the softening point; and
   cooling the glass material to a temperature of not more than the softening point.

4. A method as claimed in claim 3, further comprising the step of picking up the glass material from the bearer by using a member whose force applied to the glass material is adjustable,
   the member having a coefficient of thermal conductivity of not more than 0.01 cal./cm.sec.°C.

* * * * *